(12) United States Patent
Sugiura

(10) Patent No.: US 8,356,259 B2
(45) Date of Patent: Jan. 15, 2013

(54) INFORMATION PROCESSING APPARATUS, INFORMATION PROCESSING METHOD AND INFORMATION RECORDING MEDIUM

(75) Inventor: Kazuhiko Sugiura, Hekinan (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 826 days.

(21) Appl. No.: 12/362,957

(22) Filed: Jan. 30, 2009

(65) Prior Publication Data

US 2009/0193365 A1    Jul. 30, 2009

(30) Foreign Application Priority Data

Jan. 30, 2008   (JP) ................................. 2008-019087

(51) Int. Cl.
*G06F 3/048* (2006.01)
(52) U.S. Cl. .................... 715/840; 715/705; 717/174
(58) Field of Classification Search ............ 715/840, 715/705; 717/174
See application file for complete search history.

(56) References Cited

U.S. PATENT DOCUMENTS

| | | | | |
|---|---|---|---|---|
| 5,276,795 A * | 1/1994 | Hoeber et al. | ................ | 715/813 |
| 5,821,926 A * | 10/1998 | Arita | ............................ | 715/744 |
| 6,378,128 B1 * | 4/2002 | Edelstein et al. | ............. | 717/174 |
| 6,898,645 B2 * | 5/2005 | Abujbara | ........................ | 710/17 |
| 7,328,174 B2 * | 2/2008 | Baratz | ......................... | 705/26.81 |
| 7,802,246 B1 * | 9/2010 | Kennedy et al. | .............. | 717/173 |
| 2003/0093768 A1 * | 5/2003 | Suzuki | ............................ | 717/100 |
| 2004/0001238 A1 * | 1/2004 | Leja et al. | ..................... | 358/474 |
| 2004/0099166 A1 * | 5/2004 | Blom et al. | .................... | 101/483 |
| 2004/0250265 A1 * | 12/2004 | Suzuki et al. | ................. | 719/321 |
| 2006/0037029 A1 * | 2/2006 | Yamada | ......................... | 719/327 |
| 2006/0224438 A1 * | 10/2006 | Obuchi et al. | ................... | 705/10 |
| 2007/0074202 A1 * | 3/2007 | McMahan et al. | ............. | 717/174 |
| 2007/0245346 A1 * | 10/2007 | Shintoku | ....................... | 717/174 |
| 2007/0282997 A1 * | 12/2007 | Trochman | ..................... | 709/224 |
| 2008/0148294 A1 * | 6/2008 | Suzuki | ........................... | 719/321 |
| 2008/0301661 A1 * | 12/2008 | Haynes et al. | ................. | 717/170 |

FOREIGN PATENT DOCUMENTS

| | | |
|---|---|---|
| JP | 2003-281604 A | 10/2003 |
| JP | 2004-102623 A | 4/2004 |
| JP | 2005-050060 | 2/2005 |

(Continued)

OTHER PUBLICATIONS

JP Office Action dtd Dec. 1, 2009, JP Appln. 2008-019087, English Translation.

*Primary Examiner* — Patrick Riegler
(74) *Attorney, Agent, or Firm* — Banner & Witcoff, Ltd.

(57) ABSTRACT

The present invention provides an information processing apparatus capable of improving the operability of an installation screen. The information processing apparatus of the present invention starts up an application on an operating system to perform information processing. This information processing apparatus includes: installation means for installing the application; display means for displaying, when the application is installed, an installation screen on which a plurality of buttons, each associated with each of a plurality of setting items and operated by a user, are arranged; detection means for detecting a use environment of the information processing apparatus; and display control means for allowing, among the buttons arranged on the installation screen, the button relevant to the use environment detected by the detection means to be displayed on the display means so as to be relatively increased in display level with respect to the other buttons.

15 Claims, 11 Drawing Sheets

FOREIGN PATENT DOCUMENTS

| | | |
|---|---|---|
| JP | 2005-062978 | 3/2005 |
| JP | 2006-053659 A | 2/2006 |
| JP | 2006-201481 A | 8/2006 |
| JP | 2006-338450 | 12/2006 |
| JP | 2007-034355 A | 2/2007 |
| JP | 2007-086969 | 4/2007 |
| JP | 2007-226694 A | 9/2007 |
| JP | 2007-264864 A | 10/2007 |

* cited by examiner

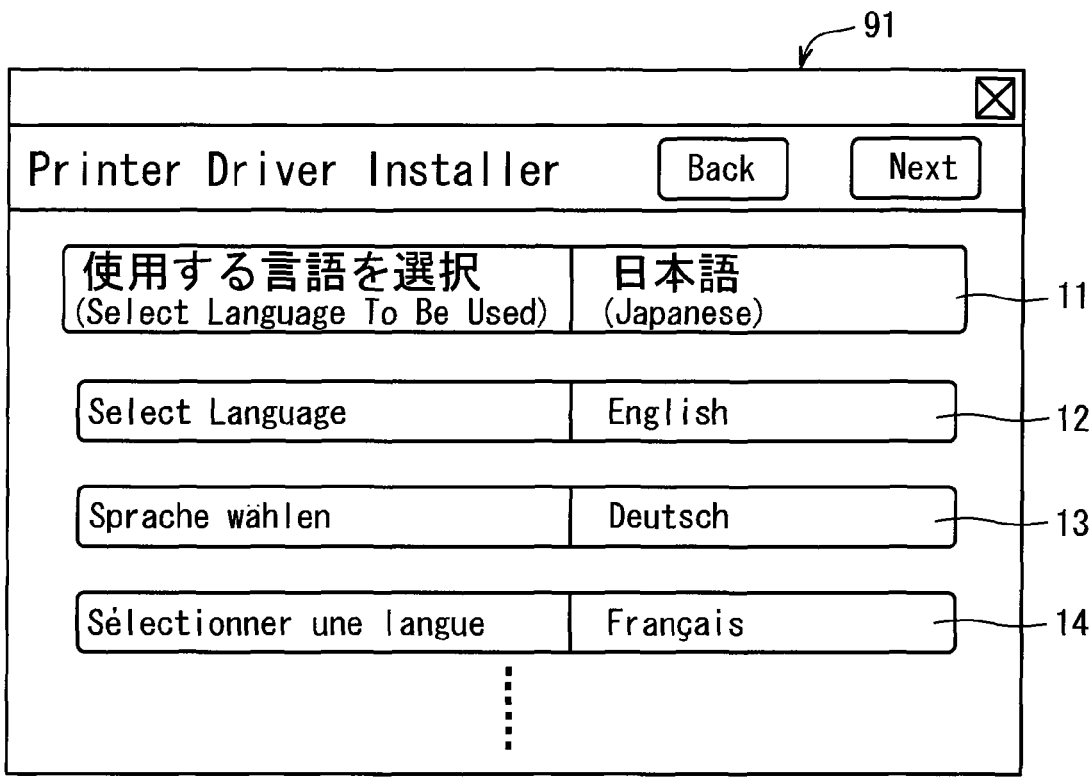

Fig. 7

| Point | Button Size |
|---|---|
| A Score Of + 20 Or More | Extra-large |
| A Score Of + 10 Or More And Less Than + 20 | Large |
| A Score Of − 10 Or More And Less Than + 10 | Normal |
| A Score Of − 20 Or More And Less Than − 10 | Small |
| A Score Of Less Than − 20 | Undisplayed (Erased) |

Fig. 8

Printer Driver Installer  [Back] [Next]

| 使用する言語を選択 (Select Language To Be Used) | 日本語 (Japanese) |
|---|---|
| Select Language | English |
| Sprache wählen | Deutsch |
| Sélectionner une langue | Français |

⋮

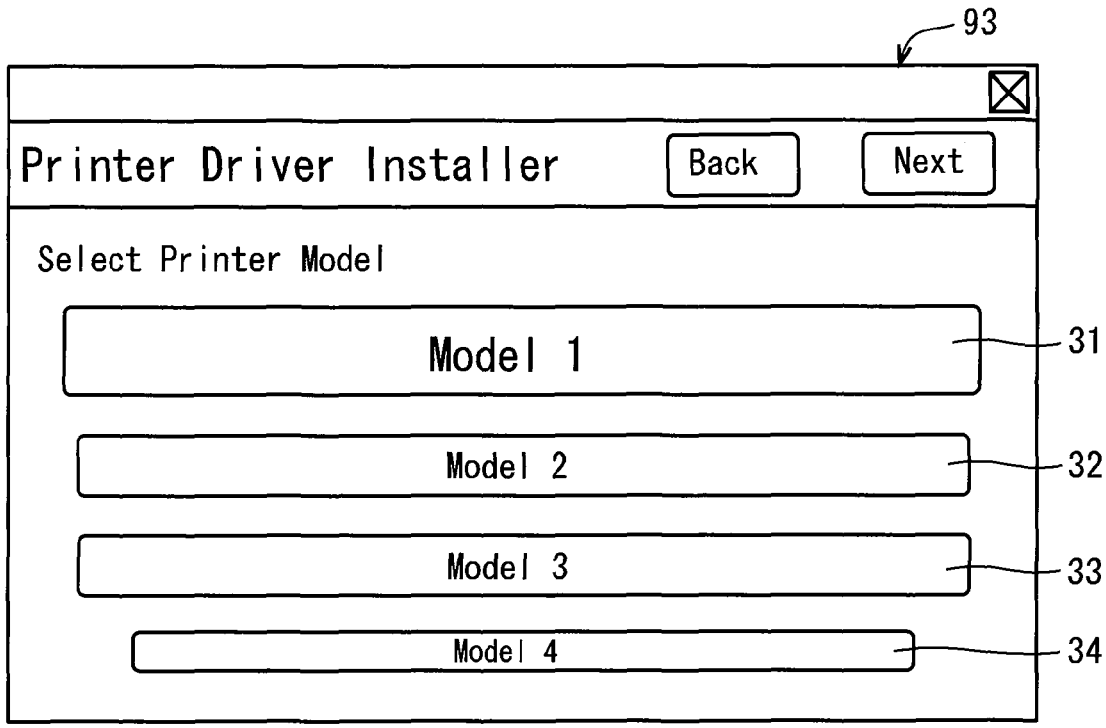

| PS Driver Or PCL Driver Selection Screen Evaluation Item | | |
|---|---|---|
| Whether A PS Driver Or A PCL Driver Has Already Been Installed As A Printer Driver | | |
| PS Driver Is Already Installed | PCL Driver Is Already Installed | Neither A PS Driver Nor A PCL Driver Is Installed Yet |
| Button 41: +10 Button 42: −10 | Button 41: −10 Button 42: +10 | Button 41: 0 Button 42: 0 |

| | | Point |
|---|---|---|
| Button 41 | +10 | A Score Of +10 |
| Button 42 | −10 | A Score Of −10 |

| Utility Selection Screen Evaluation Item | | | |
|---|---|---|---|
| Whether The Printer Is Connected Via A Network | | How Many Times Uninstallation Was Performed For The Utility In The Past | |
| Yes Button 61, 62: +10 Button 63, 64: 0 | No Button 61, 62: −10 Button 63, 64: 0 | On A Per Uninstallation Basis −10 | |

T6

| Button | | | Point |
|---|---|---|---|
| Button 61 | +10 | 0 | A Score Of +10 |
| Button 62 | +10 | 0 | A Score Of +10 |
| Button 63 | 0 | 0 | A Score Of 0 |
| Button 64 | 0 | −30 | A Score Of −30 |

P6

INFORMATION PROCESSING APPARATUS, INFORMATION PROCESSING METHOD AND INFORMATION RECORDING MEDIUM

CROSS-REFERENCE TO RELATED APPLICATION

The present application claims priority on Japanese Patent Application No. 2008-019087 filed in Japan on Jan. 30, 2008, the entire contents of which are hereby incorporated by reference.

BACKGROUND

Japanese Unexamined Patent Application Publication No. 2005-62978 discloses a conventional information processing apparatus. This information processing apparatus starts up an application on an operating system to perform information processing. This information processing apparatus includes display means and display control means.

When an application is started up to perform information processing, the display means displays an operation screen on which a plurality of buttons to be operated by a user are arranged. Each button is associated with each different information processing. Further, when the user has selected and pressed a specified button among these buttons, this information processing apparatus performs information processing associated with this selected button.

The display control means calculates, for the respective buttons arranged on the operation screen, the frequency of use based on the pressing carried out by the user, and allows the frequently used button to be displayed on the display means so as to be changed in shape (such as size, form, color, brightness, transmittance, or button depth, for example).

In the conventional information processing apparatus formed as described above, the frequently used button is displayed on the operation screen so as to be distinct from the other buttons by the display means and the display control means. Therefore, the user can recognize whether or not the frequency of use is high for each button, and can easily determine which of the buttons is to be selected. As a result, this information processing apparatus is capable of improving the operability of the operation screen displayed when an application is started up to perform information processing.

SUMMARY

An information processing apparatus of the present invention starts up an application on an operating system to perform information processing. This information processing apparatus comprises: installation means for installing the application; display means for displaying, when the application is installed, an installation screen on which a plurality of buttons, each associated with each of a plurality of setting items and operated by a user, are arranged; detection means for detecting a use environment of the information processing apparatus; and display control means for allowing, among the buttons arranged on the installation screen, the button relevant to the use environment detected by the detection means to be displayed on the display means so as to be relatively increased in display level with respect to the other buttons.

BRIEF DESCRIPTION OF THE SEVERAL VIEWS OF THE DRAWINGS

FIG. 5 is a diagram for describing a "language selection" installation screen, concerning the information processing apparatus according to the embodiment of the present invention.

FIG. 6 is a diagram for describing a table and a point chart associated with the "language selection" installation screen, concerning the information processing apparatus according to the embodiment of the present invention.

FIG. 7 is a diagram for describing a reference chart for points and sizes, concerning the information processing apparatus according to the embodiment of the present invention.

FIG. 8 is a diagram for describing a "language selection" installation screen, concerning the information processing apparatus according to the embodiment of the present invention.

FIG. 11 is a diagram for describing a "model selection" installation screen, concerning the information processing apparatus according to the embodiment of the present invention.

FIG. 12 is a diagram for describing a table and a point chart associated with the "model selection" installation screen, concerning the information processing apparatus according to the embodiment of the present invention.

DETAILED DESCRIPTION

Figure 1:
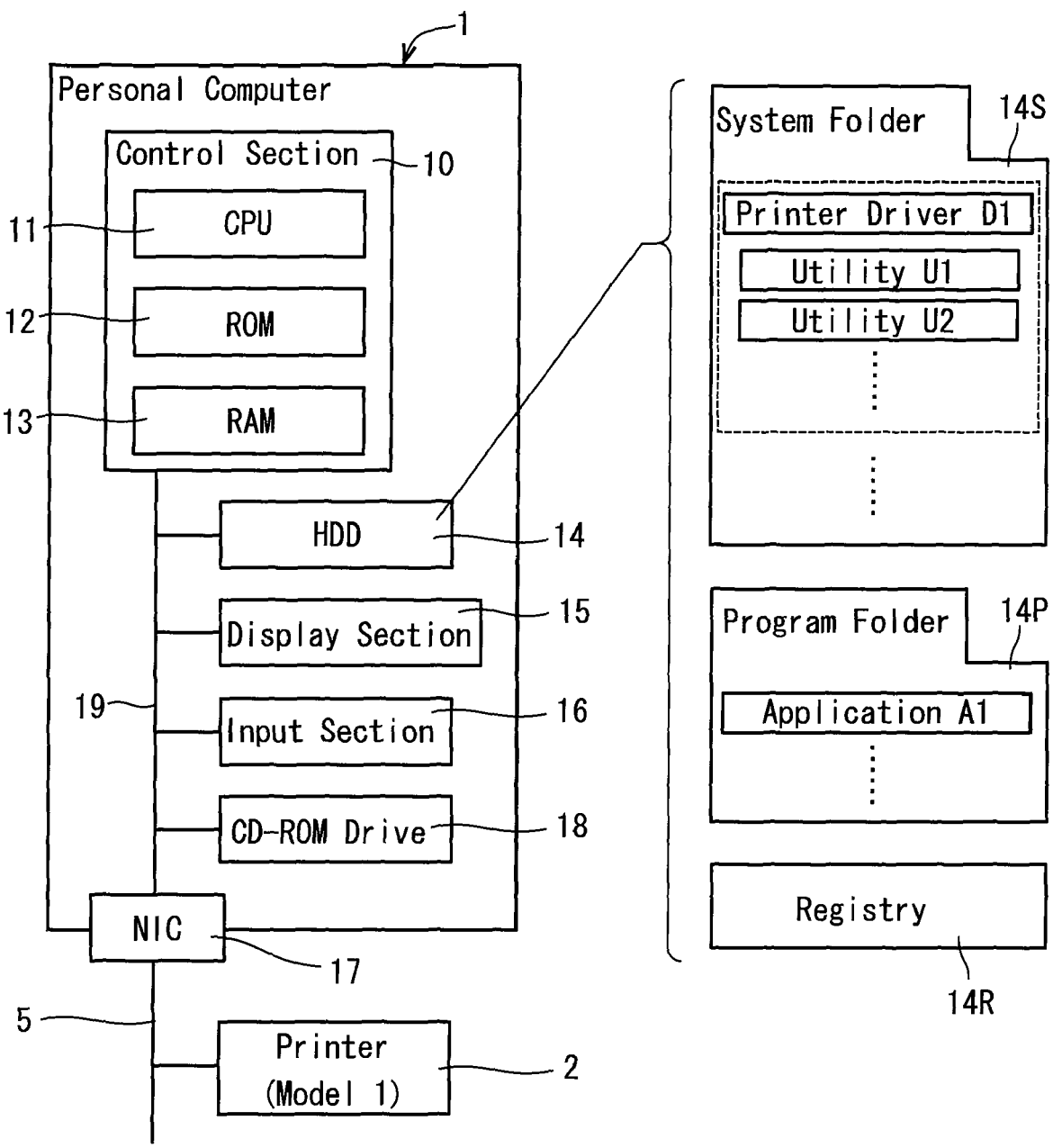
FIG. 1 is a block diagram showing a schematic configuration of an information processing apparatus according to an embodiment of the present invention.

The conventional information processing apparatus mentioned above has a problem that it is difficult to relish the above-described operating effects as for an installation screen displayed when an installer is started up. Herein, the installer refers to a program including installation means for installing an application, and serves as a type of application. On the installation screen, there are arranged a plurality of buttons each associated with each of a plurality of setting items and operated by a user. The setting items serve to set use conditions or the like for the application to be installed, and include, for example, "language used", "connection method", and "type of device to be connected", etc. The plurality of buttons associated with the setting items mean, for example, buttons such as "Japanese", "English", "German" and "French" buttons associated with the "language used", and/or buttons such as "network connection" and "local connection" buttons associated with the "connection method".

Actually, in the conventional information processing apparatus mentioned above, an installer is started up only when the installation of an application is attempted. Therefore, even when the above-described installation screen, on which a plurality of buttons are arranged, is displayed, the number of times of pressings of each button by the user is normally zero or once, or just a few times at most. Consequently, even if the display control means calculates the use frequencies of the respective buttons based on the pressing of each button by the user, there is no big difference between the use frequencies. Therefore, in this information processing apparatus, even if an attempt is made to display the frequently used button and the other buttons on the installation screen so that the frequently used button is distinct from the other buttons by the display control means, the extent of the distinction therebetween unfavorably becomes low. Accordingly, it is hard for the user to recognize the distinction between the respective buttons, and it is difficult for the user to determine which of the buttons is to be selected. Thus, it is difficult to obtain appreciable significant effects even if an attempt is made to improve the operability of the installation screen based only on the use frequency of each button.

The present invention has been made in view of the above-described conventional circumstances, and its object is to provide an information processing apparatus capable of improving the operability of an installation screen.

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the invention will be described with reference to the accompanying drawings.

As shown in FIG. 1, a personal computer (hereinafter, simply referred to as a "computer") 1, serving as a specific aspect of the information processing apparatus of an embodiment of the present invention, includes: a control section 10; a HDD (Hard Disk Drive) 14 in which various programs and data are stored; a display section 15; an input section 16; a NIC (Network Interface Card) 17 such as a LAN adaptor for connecting the computer 1 to a network 5; and a CD-ROM drive 18 for reading data stored in a CD-ROM. The computer 1 is configured so that these constituent elements are communicably connected to each other via an internal bus 19. It should be noted that the apparatus equivalent to the information processing apparatus of the present invention is not limited to the computer 1 described above, but may be an information terminal apparatus such as a PDA (Personal Digital Assistance) terminal, for example.

Together with a printer 2 or the like serving as a peripheral device connected via the network 5 such as a LAN (Local Area Network), the computer 1 constitutes a network system. The printer 2 serves as a peripheral device having a so-called "printer function" for printing an image and/or a document on a recording sheet based on print data including graphic data and/or text data transmitted from the computer 1. It should be noted that the computer 1 and each peripheral device such as the printer 2 may be directly connected via a serial cable, a USB (Universal Serial Bus) cable or the like instead of the network 5. Further, the peripheral device may be a FAX, a scanner, a multifunction device or the like.

In the computer 1, the display section 15 serves as a display device such as an LCD (Liquid Crystal Display). This display section 15 is connected to the control section 10 via an unshown video board or graphic board. When deemed appropriate, the display section 15 displays, for example, a user interface screen, an operation screen utilized when an application is started up to perform information processing, a screen for showing a process and/or a result of information processing, and installation screens 91 to 96 described later. The display of these screens is realized by a widely known GUI (Graphical User Interface) function of the computer 1.

The input section 16 serves as an input device such as a keyboard and/or a mouse. This input section 16 is connected to the control section 10 via an unshown USB terminal and/or an unshown PS/2 terminal. The input section 16 allows input of various pieces of information to the control section 10 by an operation performed by the user.

The control section 10 serves to perform centralized control of the respective constituent elements of the computer 1. The control section 10 includes known CPU 11, ROM 12, RAM 13, etc. It should be noted that in the computer 1, a circuit board, on which the respective modules such as the CPU 11, ROM 12 and RAM 13 constituting the control section 10 are located, will be generally referred to as a "motherboard".

On the computer 1, an operating system (hereinafter, simply referred to as an "OS") is installed. The computer 1 starts up various applications in this OS environment to perform information processing. In this embodiment, the applications include a printer driver, a status monitor, document creation software, mathematical software, etc. The status monitor serves to monitor the status of a system environment, a peripheral device or the like, and to display a monitoring result on the display section 15 in accordance with the user's request. It should be noted that the present embodiment will be described based on the assumption that a Windows (registered trademark) OS is installed on the computer 1. Of course, the present invention is also applicable to a computer on which the other OS is installed. Furthermore, in the OS, languages displayed on the user interface screen and the like in order to convey information to the user include "Japanese", "English", "German", "French", etc. In this embodiment, the description will be made on the assumption that Japanese is applied as this language.

The HDD 14 is formed by a combination of a large capacity disk and a reading device. This HDD 14 is provided with a system folder 14S, a program folder 14P, a registry 14R, etc. The system folder 14S stores various system files necessary for an operation of the OS, and/or a printer driver D1 or the like serving as a type of device driver. The program folder 14P stores programs of various applications, and stores an application A1, etc in the present embodiment. The registry 14R retains device information including an association between a file and a device stored in the system folder 14S and/or the program folder 14P (e.g., a reference destination of the file), and/or control information such as tables T1 to T6, point charts P1 to P6, and a reference chart H1 for points and sizes, which will be described later.

The application A1, etc. each serves as software that operates in the OS environment to allow the above-described control section 10, HDD 14, display section 15, input section 16, etc. to work in conjunction with each other, thereby performing specified information processing such as document creation, rendition or numerical calculation.

The printer driver D1 serves as software that allows a setting input screen for print setting to be displayed on the display section 15 of the computer 1 to receive a setting input from the user when printing is performed using the printer 2, for example, thereby performing a print setting such as the size of a sheet to be used for printing or the number of copies to be printed. Further, the printer driver D1 serves as software that converts image data, edited by the application A1, etc., into print data printable by the printer 2, transmits this print data to the printer 2, and allows the printer 2 to execute printing based on this print setting. It should be noted that the setting input screen is the user interface screen displayed on the display section 15 in order to receive an input via the input section 16. Furthermore, the system folder 14S stores, together with the printer driver D1, utilities U1, U2, etc., serving as practical software for improving the usability of the printer driver D1 and/or the printer 2.

Although described later in detail, the installation of the application A1, etc. and the printer driver D1, etc. as mentioned above is performed as follows. For example, the CD-ROM drive 18 is used to read data from a CD-ROM in which programs of these applications and printer drivers are recorded, various settings are made by the control section 10, and then the data is recorded in the system folder 14S or in the program folder 14P of the HDD 14. It should be noted that the above-mentioned programs are providable via a recording medium other than a CD-ROM, or through a telecommunications line such as the Internet.

The user can start up the application A1, etc. by the computer 1 configured as described above to perform information processing such as editing of data including desired document, drawing, etc. Further, the user can start up the printer driver D1 to make a print setting by operating the setting input screen for print setting, and can allow the printer 2 to perform printing of data edited by the application A1, etc. and/or data acquired from outside. In this case, the control section 10 generates print data from the above-mentioned data based on the above-described print setting, and transmits this print data to the printer 2 via the NIC 17. Then, the printer 2 forms an image corresponding to the print data on a recording sheet, thereby executing printing.

Next, a process of installation of the application A1, etc. and the printer driver D1, etc. on the computer 1 of the embodiment of the present invention will be described in detail. In this embodiment, the description will be made on the assumption that the printer driver D1 for allowing the printer 2 to perform printing is to be installed on the computer 1. The installation process of the application A1, etc. is similar to that of the printer driver D1, and therefore, the description thereof will be omitted.

<Installation Process>

For example, when the user has set the CD-ROM, in which the program of the printer driver D1 is recorded, in the CD-ROM drive 18 and instructed the start of installation by operating the input section 16, the control section 10 starts up an installer of the printer driver D1. In this embodiment, the description will be made on the assumption that the printer 2 corresponds to one of a plurality of models of the same type with different performances and/or different specifications (which will be referred to as "Model 1" in this embodiment). Further, in the CD-ROM, there is recorded an installation package including: a program of the printer driver D1 associated with each model of the printer 2; a plurality of utilities U1, U2, etc. for improving the usability of the printer 2; and an installer program for installing these program and utilities on the computer 1.

Figure 2:
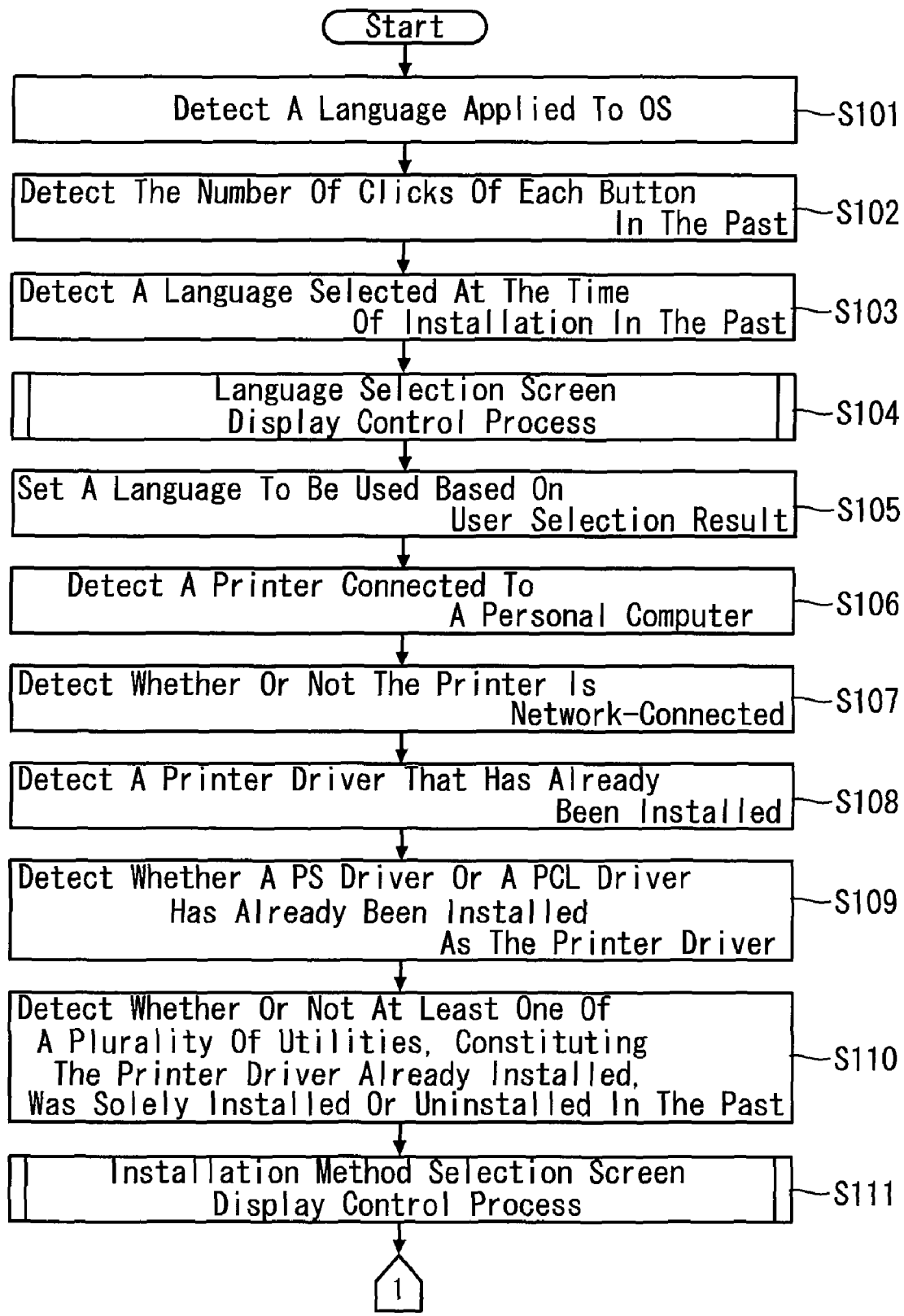
FIG. 2 is a flow chart showing an installation process, concerning the information processing apparatus of the embodiment of the present invention.
Figure 3:
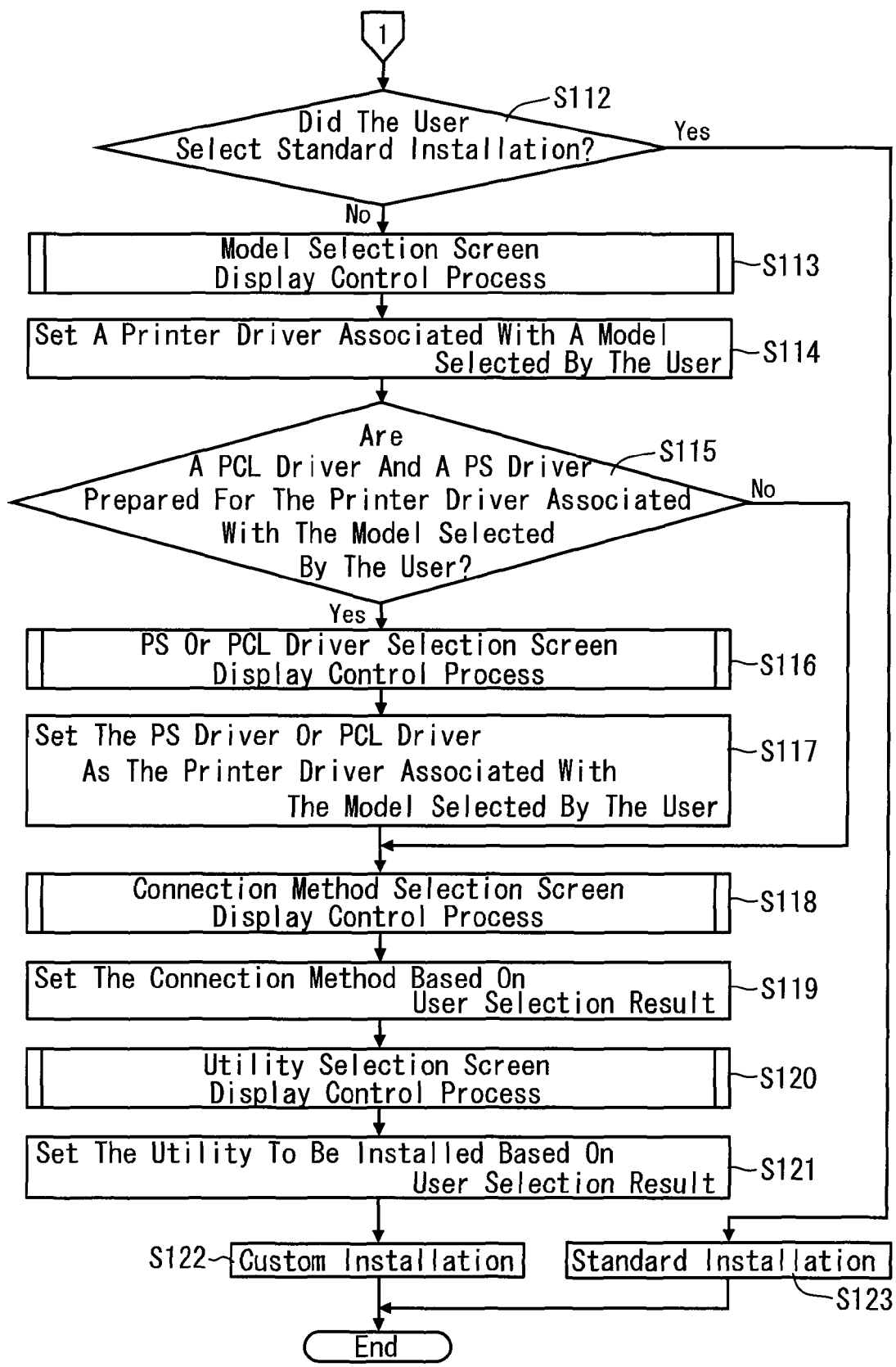
FIG. 3 is a flow chart showing the installation process, concerning the information processing apparatus according to the embodiment of the present invention.
Figure 4:
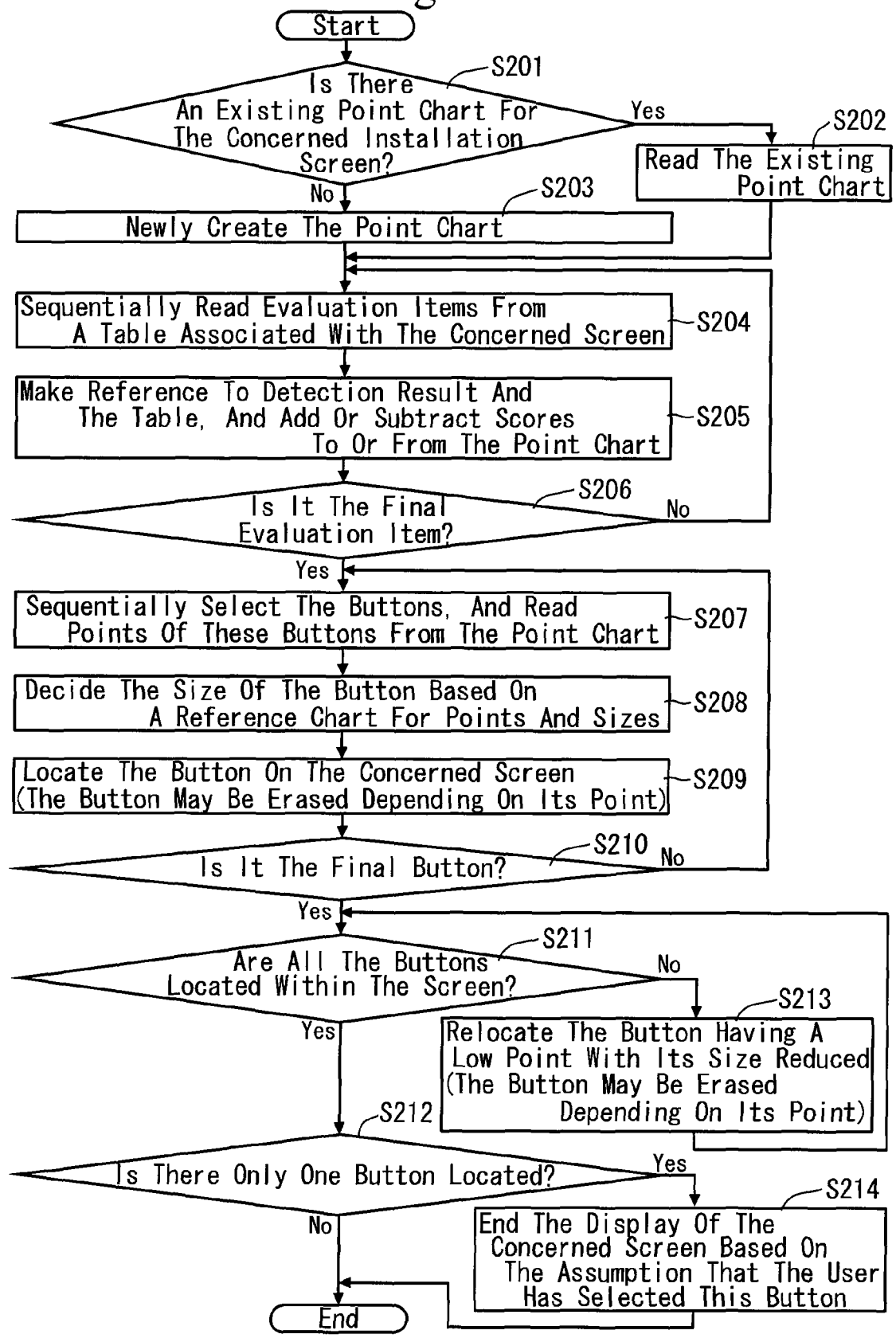
FIG. 4 is a flow chart showing a display control process subroutine, concerning the information processing apparatus according to the embodiment of the present invention.

The control section 10 controls the CD-ROM drive 18 to read data therefrom, and starts the installation process of the printer driver D1 in accordance with flow charts of FIGS. 2 to 4.

As shown in FIG. 2, in Steps S101 to S105, a process of allowing the user to select a language, which is applied to a character on an operation screen displayed at the startup of the printer driver D1, is performed. More specifically, a "language selection" installation screen 91, shown as a specific example in FIG. 5, is displayed on the display section 15. The "language selection" installation screen 91 is associated with the following setting item: "Language Applied To A Character On An Operation Screen Displayed At The Startup Of The Printer Driver D1". On the "language selection" installation screen 91, a plurality of language selection buttons 11 to 14 . . . are located. FIG. 5 shows only the language selection button 11 associated with "Japanese", the language selection button 12 associated with "English", the language selection button 13 associated with "German" and the language selection button 14 associated with "French", and the language selection buttons associated with the other languages are omitted in FIG. 5. Furthermore, upon selection of one of a plurality of the language selection buttons 11 to 14 . . . by the user, the control section 10 applies the language, which is associated with this selected button, to a character on the operation screen displayed at the startup of the printer driver D1. In this case, as will be described below, the control section 10 detects, as a use environment of the computer 1, information concerning the language in Steps S101 to S103, and controls the display levels of the respective language selection buttons 11 to 14 in Step S104.

First, in Step S101, a language applied to the OS is detected. The "language applied to the OS" in this case does not mean a program language, but means a language applied to a character displayed on the user interface screen or the like in order to convey information to the user. In the present embodiment, Japanese is detected as the language applied to the OS.

Next, in Step S102, the number of clicks of each of the language selection buttons 11 to 14 . . . when an installer was started up in the past is detected. Information on the number of clicks may be retained as control information in the registry 14R every time an installer is started up, and the information may be read from the registry 14R in Step S102.

Next, in Step S103, a language, selected as a language applied to the character on the operation screen displayed at the startup of the printer driver D1 when an installer was started up in the past, is detected. Information on this language may also be retained as control information in the registry 14R every time an installer is started up, and the information may be read from the registry 14R in Step S103.

Next, in Step S104, a process of controlling the display levels of the respective language selection buttons 11 to 14 . . . is performed. More specifically, a display control process subroutine (Steps S201 to S214) shown in FIG. 4 is executed.

First, in Step S201 shown in FIG. 4, it is determined whether or not there is an existing point chart for the "language selection" installation screen 91. The point chart is, for example, a point chart P1, a specific example of which is shown in FIG. 6. In the present embodiment, the following description will be made on the assumption that the point chart P1 is newly created every time an installer is started up, i.e., the answer is "No" in Step S201. It should be noted that if an installer was started up in the past, a point chart created at that time may be retained as an existing point chart in the registry 14R.

When the answer is "Yes" in Step S201, the process proceeds to Step S202 to read the point chart P1 from the registry 14R, and then the process proceeds to Step S204. On the other hand, when the answer is "No" in Step S201, the process proceeds to Step S203 to newly create the point chart P1 shown in FIG. 6, and then the process proceeds to Step S204. At the stage when the process proceeds from Step S203 to Step S204, all the numerical values in respective boxes of the point chart P1 are 0.

In Step S204, evaluation items are sequentially read from a table associated with the "language selection" installation screen 91. In this embodiment, the table associated with the "language selection" installation screen 91 is, for example, a table T1, a specific example of which is shown in FIG. 6, and has detection results detected in Steps S101 to S103, and numerical values associated with the respective detection results. More specifically, the table T1 has an evaluation item "Whether It Corresponds To The Language Applied To The OS" associated with Step S101, an evaluation item "The Number Of Clicks In The Past" associated with Step S102, and an evaluation item "Whether It Corresponds To The Language Selected At The Time Of Installation In The Past" associated with Step S103.

First, in Step S204, the evaluation item "Whether It Corresponds To The Language Applied To The OS" is read as the first evaluation item. Then, the process proceeds to Step S205 to make reference to a detection result of Step S101 and a numerical value of the table T1. Specifically, the language selection button 11 associated with "Japanese" corresponds to Japanese, which is the detection result of Step S101. In this case, "Yes: +10", serving as a numerical value associated with the detection result in this evaluation item, is applicable, and therefore, a score of +10 is given as a point to the box of the language selection button 11 of the point chart P1. On the other hand, the language selection buttons 12 to 14 . . . , which are not associated with "Japanese", do not correspond to Japanese, which is the detection result of Step S101. In this case, "No: −10", serving as a numerical value associated with the detection result in this evaluation item, is applicable, and therefore, a score of −10 is given as a point to each of the boxes of the language selection buttons 12 to 14 . . . of the point chart P1.

Next, the process proceeds to Step S206 to determine whether or not the evaluation item is the final evaluation item. When the answer is "Yes" in Step S206, the process proceeds to Step S207, and when the answer is "No" in Step S206, the process returns to Step S204. At this stage, the answer is "No" since the first evaluation item is read, and the process returns to Step S204.

When the process has returned to Step S204, the evaluation item "The Number Of Clicks In The Past" is read as the second evaluation item. Then, the process proceeds to Step S205 to make reference to a detection result of Step S102 and a numerical value of the table T1. For example, if the detection result of Step S102 is once as for the language selection button 11, a score of +1 is given as a point to the box of the language selection button 11 of the point chart P1 in accordance with "+1 on a per click basis", which is a numerical value associated with the detection result in this evaluation item. On the other hand, for example, when the detection result of Step S102 is zero as for the language selection buttons 12 to 14 . . . , a score of 0 is given as a point to each of the boxes of the language selection buttons 12 to 14 . . . of the point chart P1.

Next, the process proceeds to Step S206, and at this stage, the answer will be "No" since the second evaluation item is read; thus, the process returns to Step S204.

When the process has returned to Step S204, the evaluation item "Whether It Corresponds To The Language Selected At The Time Of Installation In The Past" is read as the third evaluation item. Then, the process proceeds to Step S205 to make reference to a detection result of Step S103 and a numerical value of the table T1. For example, when only Japanese is detected as the language selected at the time of installation in the past, the language selection button 11 associated with "Japanese" corresponds to the detection result of Step S103. In this case, "Yes: +5", serving as a numerical value associated with the detection result in this evaluation item, is applicable, and therefore, a score of +5 is given as a point to the box of the language selection button 11 of the point chart P1. On the other hand, the language selection buttons 12 to 14 . . . , which are not associated with "Japanese", do not correspond to the detection result of Step S103. In this case, "No: 0", serving as a numerical value associated with the detection result in this evaluation item, is applicable, and therefore, a score of 0 is given as a point to each of the boxes of the language selection buttons 12 to 14 . . . of the point chart P1.

Next, the process proceeds to Step S206, and at this stage, the answer will be "Yes" since the third evaluation item is read; thus, the process proceeds to Step S207. At this stage, the numerical values within the respective boxes of the point chart P1 are summed, and as shown in the rightmost boxes of the point chart P1, the points of the respective language selection buttons 11 to 14 . . . are determined. The numerical value within each box of the point chart P1 shown in FIG. 6 is just an example, and it may be varied in accordance with the detection results of Steps S101 to S103. Hereinafter, the description will be made using the point chart P1 shown in FIG. 6 as an example.

In Step S207, the language selection buttons 11 to 14 . . . are sequentially selected, and points of these buttons are read from the point chart P1. First, upon selection of the language selection button 11, a score of +16 is read from the point chart P1.

Next, in Step S208, reference is made to a reference chart H1 for points and sizes shown in FIG. 7, and to the read point, thereby determining the size of the language selection button 11. In this case, since a score of +16 corresponds to "a score of +10 or more and less than +20", the size of the language selection button 11 is determined as "large".

Next, in Step S209, as shown in FIG. 5, the language selection button 11 is located on the "language selection" installation screen 91. In this case, since the size of the language selection button 11 is "large", the language selection button 11 is located so that the outer shape and characters thereof are larger than normal by controlling the display.

Next, the process proceeds to Step S210 to determine whether or not the button is the final button. When the answer is "Yes" in Step S210, the process proceeds to Step S211, and when the answer is "No" in Step S210, the process returns to Step S207. At this stage, the answer will be "No" since the first button is read, and the process returns to Step S207.

Similarly to the language selection button 11, the process steps of Steps S207 to S209 are performed on the language selection buttons 12 to 14 . . . . In this case, the point of each of the language selection buttons 12 to 14 . . . is a score of −10, which corresponds to "a score of −10 or more and less than +10" of the reference chart H1; therefore, the size of each of the language selection buttons 12 to 14 . . . is determined as "normal" in Step S208. Then, in Step S209, as shown in FIG. 5, the language selection buttons 12 to 14 . . . are located on the "language selection" installation screen 91 so that the outer shapes and characters thereof remain normal. It should be noted that if the point of the button is "a score of less than −20" as shown in the reference chart H1, this button is erased in Step S209. This is because when the point of the button is particularly small, the possibility that the user selects this button is low, and therefore, no problem occurs even if this button is not displayed while the user's time and trouble can be saved.

The reference chart H1 is also used in Steps S111, S113, S116, S118, and S120 which will be described later. For the "language selection" installation screen 91, the table T1 is set so that the point of each of the language selection buttons 11 to 14 . . . will not become "a score of less than −10" for the sake of simplification of description. Therefore, the size of each button will not be "small" or "undisplayed (erased)", but if the setting of the table T1 is changed, the size of each button may be "small" or "undisplayed (erased)". Furthermore, for a "model selection" installation screen 93 and a "utility selection" installation screen 96, which will be described later, a specific example in which the size of the button may be "small" or "undisplayed (erased)" will be given.

Then, when all the language selection buttons 11 to 14 . . . have been located on the "language selection" installation screen 91, the process proceeds to Step S211 to determine whether or not all the language selection buttons 11 to 14 . . . are located within the "language selection" installation screen 91. For example, if the points of a plurality of the language selection buttons are large, there might occur a problem that the language selection buttons are located off the "language selection" installation screen 91, or the respective buttons are overlapped with each other. In such a case, the answer will be "No" in Step S211, and the process proceeds to Step S213 in which the point of the button, having a low point among the language selection buttons 11 to 14 . . . is further decreased to relocate the button with the outer shape and characters thereof reduced. In this case, if the decreased point is "a score of less than −20" as shown in the reference chart H1, the button is erased. Thus, the appearance of the "language selection" installation screen 91 can be enhanced. Then, the process returns to Step S211.

On the other hand, when the answer is "Yes" in Step S211, the process proceeds to Step S212 to determine whether or not the number of the buttons located on the "language selection" installation screen 91 is only one among the respective language selection buttons 11 to 14 . . . .

When the answer is "Yes" in Step S212, the process proceeds to Step S214. In Step S214, based on the assumption that the user has selected this button, the display of the "language selection" installation screen 91 is ended, and then the display control process subroutine (Steps S201 to S214) is ended so that the process proceeds to Step S105 shown in FIG. 2. Thus, the installation screen, which does not have to be selected by the user, is undisplayed, thereby making it possible to save user's time and trouble.

On the other hand, when the answer is "No" in Step S212, the display levels of all the language selection buttons 11 to 14 . . . are controlled, and then, based on the assumption that the process of locating the language selection buttons on the "language selection" installation screen 91 is ended, the display control process subroutine (Steps S201 to S214) is ended so that the process proceeds to Step S105 shown in FIG. 2.

At this stage, if the points correspond to the numerical values presented in the point chart P1 shown in FIG. 6, then as shown in FIG. 5, only the language selection button 11 is located so as to have a "large" size, while the other language selection buttons 12 to 14 . . . are each located so as to have a normal size. Further, in the point chart P1 shown in FIG. 6, if the number of clicks of the language selection button 11 in the past is not once but five times, for example, the final point of the language selection button 11 is not a score of +16 but is a score of +20. In such a case, the point corresponds to "a score of +20 or more" of the reference chart H1 shown in FIG. 7, and therefore, the language selection button 11 will be located on the "language selection" installation screen 91 so as to have an "extra-large" size as shown in FIG. 8.

Referring to FIG. 2, when the process has proceeded to Step S105, an input signal from the input section 16 operated by the user is detected, and it is determined which of the buttons is selected by the user from among the language selection buttons 11 to 14 . . . . Then, based on the determination result, the control section 10 sets the language applied to the character on the operation screen displayed at the startup of the printer driver D1.

In this case, the user can recognize the language selection button 11 corresponding to the language detected in Step S101, with priority given to the language selection button 11 over the other language selection buttons 12 to 14 . . . . Therefore, as the language applied to the character on the operation screen displayed at the startup of the printer driver D1, the language corresponding to the language applied to the OS can be easily selected.

Furthermore, in the display control process subroutine (Steps S201 to S214), the detection results of Steps S102 and Step S103 are also utilized for the control of the display levels of the respective language selection buttons 11 to 14 . . . , and therefore, the user can comprehensively determine which of the language selection buttons 11 to 14 . . . should be selected.

Next, the control section 10 detects information concerning the network, the printer 2, the printer driver D1, etc. as the use environment of the computer 1 in Steps S106 to Step S110 as described below.

First, in Step S106, a printer connected to the computer 1 is detected by using the above-mentioned status monitor or the like. In this step, since a plurality of models with different performances and/or different specifications generally exist for one type of printer, it is also simultaneously detected what model the detected printer is. In the present embodiment, as shown in FIG. 1, the printer 2 is connected to the computer 1, and therefore, the printer 2 is detected. Also, the model of the printer 2 is detected as being Model 1.

Next, in Step S107, it is detected whether or not the printer connected to the computer 1 is connected via a network. In the present embodiment, as shown in FIG. 1, the printer 2 is connected to the computer 1 via the network 5, and therefore, the detection result indicates network connection.

Next, in Step S108, a printer driver that has already been installed on the computer 1 is detected. Specifically, the system folder 14S is searched. In this case, information on the version of the detected printer driver is also simultaneously detected. Further, a utility installed in the system folder 14S together with the printer driver is also simultaneously detected. In the present embodiment, the following description will be made on the assumption that the printer driver D1 has already been installed on the computer 1 and the utilities U1, U2 ... have also already been installed on the computer 1 as shown in FIG. 1. Furthermore, the printer driver D1 that has already been installed is an old version.

Next, in Step S109, it is detected whether a PostScript driver (hereinafter, simply referred to as a "PS driver") or a PCL (PCL: Printer Control Language) driver has already been installed as the printer driver detected in Step S108. The PS driver means a printer driver in which "PostScript" is adopted as a language for controlling a printer, while the PCL driver means a printer driver in which "PCL" is adopted as a language for controlling a printer.

Next, in Step S110, it is detected whether or not at least one of a plurality of the utilities, constituting the printer driver that has already been installed, was solely installed or uninstalled in the past. In the present embodiment, the utilities U1, U2 ... etc. are also installed in the system folder 14S together with the printer driver D1 as shown in FIG. 1, and it is detected whether or not at least one of the printer driver D1 and the utilities U1, U2 ... was solely installed or uninstalled in the past. In this case, it is also detected how many times the utilities U1, U2 ... were uninstalled in the past. Information on the number of times of the uninstallation may be retained as control information in the registry 14R every time an installer is started up, and may be read from the registry 14R in Step S110.

Figure 9:
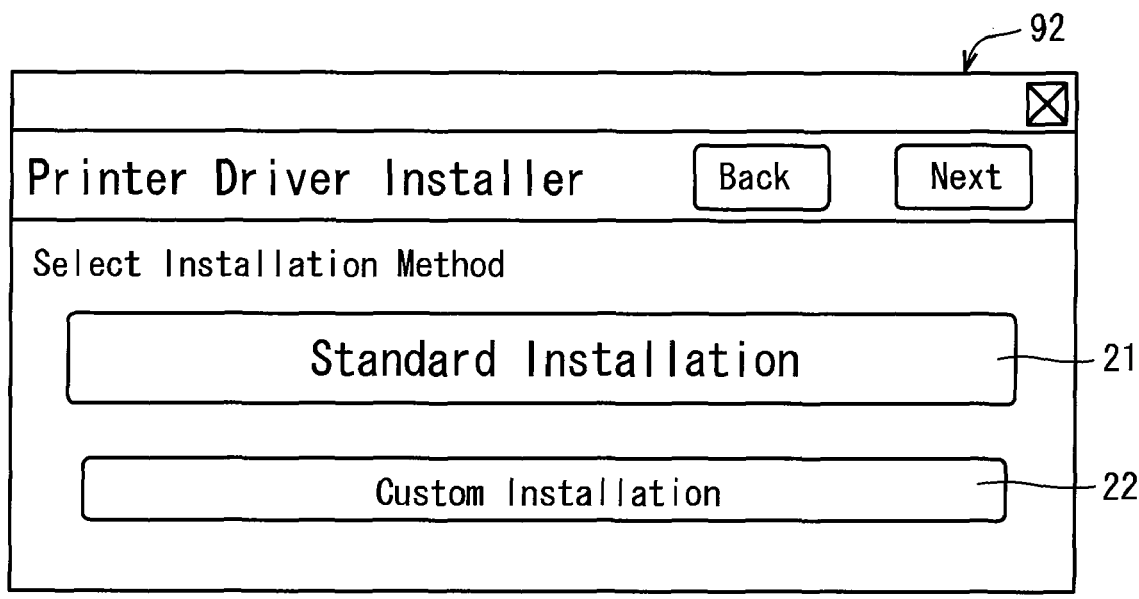
FIG. 9 is a diagram for describing an "installation method selection" installation screen, concerning the information processing apparatus according to the embodiment of the present invention.

Next, in Step S111, for an "installation method selection" installation screen 92 shown in FIG. 9, a process of controlling the display levels of a standard installation button 21 and a custom installation button 22 is performed. The "installation method selection" installation screen 92 is associated with a setting item "Installation Method". The installation method includes the following two types of installation: standard installation carried out in Step S123 described later, and custom installation carried out in Step S122 described later. The standard installation button 21 serves to allow a setting for executing standard installation, and the custom installation button 22 serves to allow a setting for executing custom installation.

Figure 10:
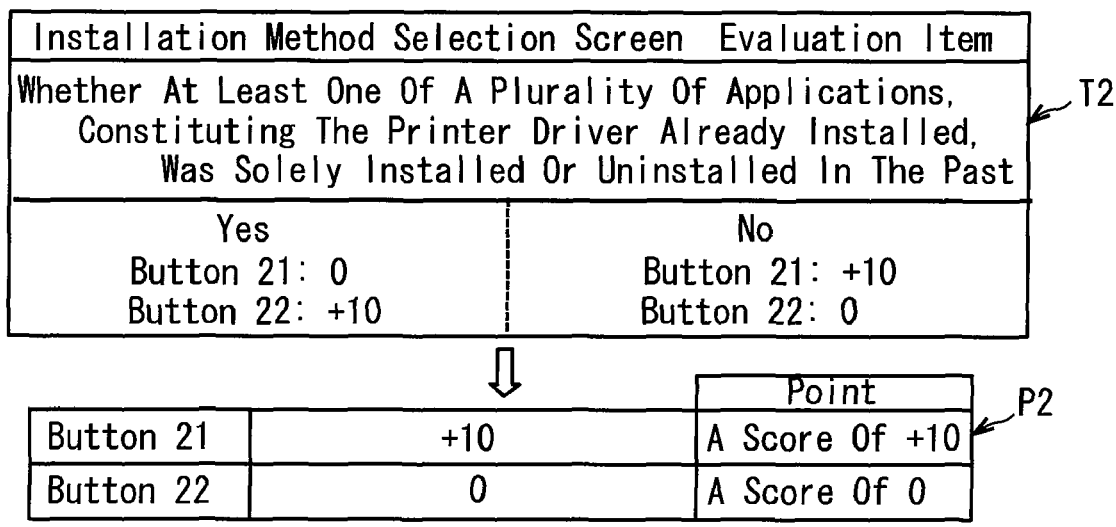
FIG. 10 is a diagram for describing a table and a point chart associated with the "installation method selection" installation screen, concerning the information processing apparatus according to the embodiment of the present invention.

More specifically, the display control process subroutine (Steps S201 to S214) shown in FIG. 4 is executed. It should be noted that the display control process subroutine executed in this case is different from the display control process subroutine (Steps S201 to S214) executed in Step S104 described above in the following three points. First, an installation screen to be subjected to display control is the "installation method selection" installation screen 92, a specific example of which is shown in FIG. 9. Secondly, a point chart to which reference is made is a point chart P2, a specific example of which is shown in FIG. 10. And thirdly, a table to which reference is made is a table T2, a specific example of which is shown in FIG. 10. As a reference chart to which reference is made, the reference chart H1 shown in FIG. 7 is used. Therefore, the description of common parts of the foregoing process steps described in Step S104 will be omitted or simplified.

First, in Steps S201 to S203 shown in FIG. 4, the point chart P2 is prepared for the "installation method selection" installation screen 92.

Next, in Steps S204 to S206, an evaluation item is read from the table T2 associated with the "installation method selection" installation screen 92. The table T2 has an evaluation item "Whether At Least One Of A Plurality Of The Utilities, Constituting A Printer Driver Already Installed, Was Solely Installed Or Uninstalled In The Past" associated with Step S110.

Then, in Step S204, upon reading of the evaluation item, the process proceeds to Step S205 to make reference to a detection result of the Step S110 and a numerical value of the table T2. Specifically, when the detection result of Step S110 indicates "Yes", "Yes: 0 for the button 21, and +10 for the button 22" is applicable; therefore, in the point chart P2, a score of 0 is given as a point to the box of the standard installation button 21, while a score of +10 is given as a point to the box of the custom installation button 22. This is because if at least one of the utilities was solely installed or uninstalled in the past, there is a high possibility that the user selects custom installation hereafter.

On the other hand, when the detection result of Step S110 indicates "No", "No: +10 for the button 21, and 0 for the button 22", serving as numerical values corresponding to the detection result in this evaluation item, is applicable; therefore, as shown in the point chart P2 of FIG. 10, a score of +10 is given as a point to the box of the standard installation button 21, while a score of 0 is given as a point to the box of the custom installation button 22. This is because if no utility was solely installed or uninstalled in the past, there is a high possibility that the user selects standard installation.

Next, in Steps S207 to S209, the sizes of the standard installation button 21 and the custom installation button 22 are decided, and the standard installation button 21 and the custom installation button 22 are located on the "installation method selection" installation screen 92. Then, after the foregoing process steps of Steps S211 to S214 have been performed, the display control process subroutine (Steps S201 to S214) is ended, and the process proceeds to Step S112 shown in FIG. 3.

At this stage, if the points correspond to the numerical values presented in the point chart P2 shown in FIG. 10, i.e., if the answer is "No" as for the evaluation item of the table T2, then as shown in FIG. 9, the standard installation button 21 is located so as to have a "large" size, while the custom installation button 22 is located so as to have a "normal" size. Further, if the answer is "Yes" as for the evaluation item of the table T2, the point of the standard installation button 21 is not a score of +10 but is a score of 0, while the point of the custom installation button 22 is not a score of 0 but is a score of +10 in the point chart P2. In such a case, unlike FIG. 9, the standard installation button 21 is located so as to have a "normal" size, while the custom installation button 22 is located so as to have a "large" size.

Next, when the process has proceeded to Step S112 shown in FIG. 3, an input signal from the input section 16 operated by the user is detected, and it is determined which of the standard installation button 21 and the custom installation button 22 is selected by the user. Then, based on the determination result, the control section 10 sets the installation method.

Thus, in Step S111, one of the standard installation button 21 and the custom installation button 22 is conspicuously displayed based on the detection result of Step S110, and therefore, the user can preferentially recognize the button, which is more likely to be selected. Consequently, the user is allowed to easily select standard installation or custom installation based on a history of installation or uninstallation performed solely in the past.

When it is determined that the user has selected the standard installation button 21 in Step S112, the process proceeds to Step S123. Then, for the printer driver D1, standard installation is carried out in Step S123. Specifically, based on information concerning use environments such as: the setting of the language to be used in Step S105; and the printer and its model, the installed printer driver and its version, and whether or not network connection is established, which are detected in Steps S106 to S110, the control section 10 selects a version of the printer driver D1, which should be automatically installed, the model associated therewith, the utility installed together therewith, etc., and executes the installation thereof. Then, the printer driver D1 and the utilities U1, U2, etc. are held in the system folder 14S. Thus, this installation process is ended.

On the other hand, when it is determined that the user has selected the custom installation button 22 in Step S112, the process proceeds to Step S113.

Next, in Step S113, for the "model selection" installation screen 93 shown in FIG. 11, a process of controlling the display levels of model selection buttons 31 to 34 is performed. The "model selection" installation screen 93 is associated with a setting item "Printer Model". The model selection buttons 31 to 34 are associated with models 1 to 4 with different specifications and/or performances prepared for the same type as the printer 2.

More specifically, the display control process subroutine (Steps S201 to S214) shown in FIG. 4 is executed. It should be noted that the display control process subroutine executed in this case is different from the display control process subroutine (Steps S201 to S214) executed in Step S104 or the like described above in the following three points. First, an installation screen to be subjected to display control is the "model selection" installation screen 93, a specific example of which is shown in FIG. 11. Secondly, a point chart to which reference is made is a point chart P3, a specific example of which is shown in FIG. 12. And thirdly, a table to which reference is made is a table T3, a specific example of which is shown in FIG. 12. As a reference chart to which reference is made, the reference chart H1 shown in FIG. 7 is used. Therefore, the description of common parts of the foregoing process steps described in Step S104 or the like will be omitted or simplified.

First, in Steps S201 to S203 shown in FIG. 4, the point chart P3 is prepared for the "model selection" installation screen 93.

Next, in Steps S204 to S206, evaluation items are sequentially read from the table T3 associated with the "model selection" installation screen 93. The table T3 has the following two evaluation items: "Whether A Printer Driver Associated With The Concerned Model Is Relevant To A Printer Driver That Has Already Been Installed" associated with the detection results of Steps S106 and S108, and "Whether the Printer Driver That Has Already Been Installed Is An Old Version Or A New Version With Respect To The Printer Driver Associated With The Concerned Model" associated with the detection result of Step S108.

Then, in Step S204, upon reading of the first evaluation item "Whether A Printer Driver Associated With The Concerned Model Is Relevant To A Printer Driver That Has Already Been Installed", the process proceeds to Step S205 to make reference to the detection results of the Steps S106 and S108 and a numerical value of the table T3. Specifically, when the printer and printer driver model detected in Steps S106 and S108 are relevant to any of models associated with the respective model selection buttons 31 to 34, "Yes: +5", serving as a numerical value associated with the detection results in this evaluation item, is applicable. Therefore, in the point chart P3, a score of +5 is given as a point to the box of the relevant one of the model selection buttons 31 to 34. On the other hand, a score of 0 is given as a point to the box of the irrelevant one (e.g., the model selection button 32) of the model selection buttons 31 to 34 in accordance with "No: 0".

Next, in Step S204, upon reading of the second evaluation item "Whether the Printer Driver That Has Already Been Installed Is An Old Version Or A New Version With Respect To The Printer Driver Associated With The Concerned Model", the process proceeds to Step S205 to make reference to the detection result of Step S108 and a numerical value of the table T3.

Specifically, it is determined whether the version of the printer driver D1 detected in Step S108 is old, the same, or new with respect to the version of the printer driver associated with each of the model selection buttons 31 to 34. For example, when the version of the printer driver D1 that has already been installed is old with respect to that of the printer driver associated with the model selection button 31, "Old Version: +10", serving as a numerical value associated with the detection result in this evaluation item, is applicable. Therefore, a score of +10 is given as a point to the box of the model selection button 31 of the point chart P3. This is because when an old version has been installed, the possibility of newly installing a new version is high.

Further, for example, when the version of the printer driver D1 that has already been installed is the same as that of the printer driver associated with the model selection button 33, "Same Version: 0" is applicable, and therefore, a score of 0 is given as a point to the box of the model selection button 33. Furthermore, for example, when the version of the printer driver D1 that has already been installed is new with respect to that of the printer driver associated with the model selection button 34, "New Version: −20" is applicable, and therefore, a score of −20 is given as a point to the box of the model selection button 34. This is because when a new version has been installed, the possibility of newly installing an older version is low.

Next, in Steps S207 to S209, the sizes of the respective model selection buttons 31 to 34 are decided, and the respective model selection buttons 31 to 34 are located on the "model selection" installation screen 93. Then, after the foregoing process steps of Steps S211 to S214 have been performed, the display control process subroutine (Steps S201 to S214) is ended, and the process proceeds to Step S114 shown in FIG. 3.

At this stage, if the points correspond to numerical values presented in the point chart P3 shown in FIG. 12, then as shown in FIG. 11, the model selection button 31 associated with "Model 1" is located so as to have a "large" size, the model selection button 32 associated with "Model 2" is located so as to have a "normal" size, the model selection button 33 associated with "Model 3" is located so as to have a "normal" size, and the model selection button 34 associated with "Model 4" is located so as to have a "small" size.

Next, when the process has proceeded to Step S114, an input signal from the input section 16 operated by the user is detected, and it is determined which of the model selection buttons 31 to 34 is selected by the user. Then, based on the determination result, the control section 10 sets the associated printer driver.

Thus, in Step S113, one of the model selection buttons 31 to 34 is conspicuously displayed based on the detection results of Steps S106 and S108, and therefore, the user can preferentially recognize the button, which is more likely to be selected. Consequently, the user is allowed to easily select the model based on the printer that has already been connected, its model, the version of the installed printer driver, and the like.

Next, in Step S115, it is determined whether a PS driver and a PCL driver are prepared for the printer driver associated with the model selected by the user. When the answer is "No" in Step S115, Steps S116 and S117 are skipped, and the process proceeds to Step S118. On the other hand, when the answer is "Yes" in Step S115, the process proceeds to Step S116.

Figures 13, 14:
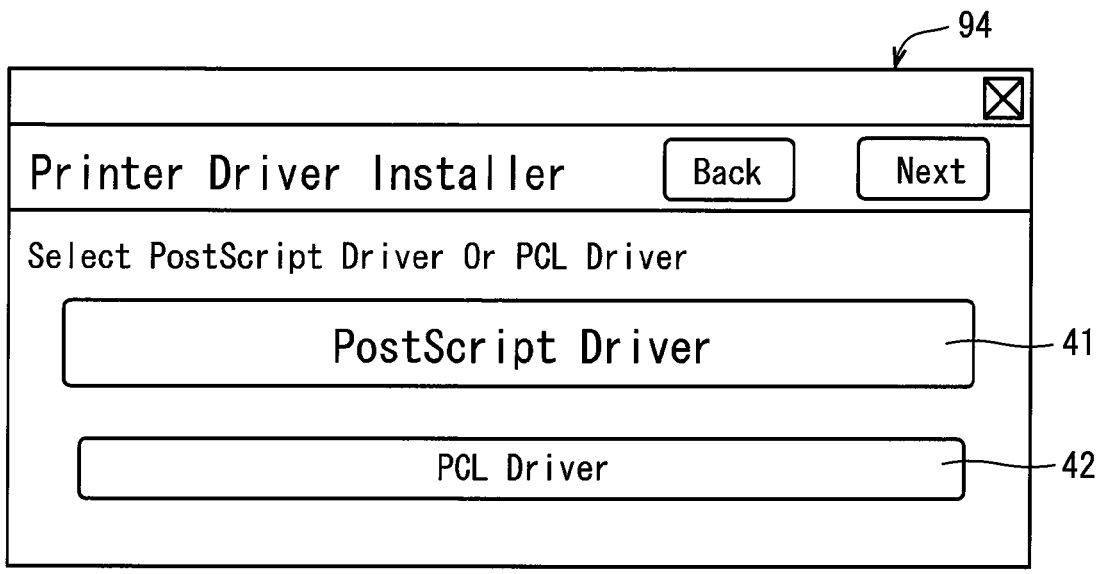
FIG. 13 is a diagram for describing a "PS driver or PCL driver selection" installation screen, concerning the information processing apparatus according to the embodiment of the present invention.
FIG. 14 is a diagram for describing a table and a point chart associated with the "PS driver or PCL driver selection" installation screen, concerning the information processing apparatus according to the embodiment of the present invention.

In Step S116, for a "PS driver or PCL driver selection" installation Screen 94 shown in FIG. 13, a process of controlling the display levels of a button 41 for installing a PS driver and a button 42 for installing a PCL driver is performed. The "PS driver or PCL driver selection" installation screen 94 is associated with a setting item "PS Driver Or PCL Driver". More specifically, the display control process subroutine (Steps S201 to S214) shown in FIG. 4 is executed. It should be noted that the display control process subroutine executed in this case is different from the display control process subroutine (Steps S201 to S214) executed in Step S104 or the like described above in the following three points. First, an installation screen to be subjected to display control is the "PS driver or PCL driver selection" installation screen 94, a specific example of which is shown in FIG. 13. Secondly, a point chart to which reference is made is a point chart P4, a specific example of which is shown in FIG. 14. And thirdly, a table to which reference is made is a table T4, a specific example of which is shown in FIG. 14. As a reference chart to which reference is made, the reference chart H1 for points and sizes shown in FIG. 7 is used. Therefore, the description of common parts of the foregoing process steps described in Step S104 or the like will be omitted or simplified.

First, in Steps S201 to S203 shown in FIG. 4, the point chart P4 is prepared for the "PS driver or PCL driver selection" installation screen 94.

Next, in Steps S204 to S206, an evaluation item is read from the table T4 associated with the "PS driver or PCL driver selection" installation screen 94. The table T4 has an evaluation item "Whether A PS Driver Or A PCL Driver Has Already Been Installed As A Printer Driver" associated with the detection result of Step S109.

Then, in Step S204, upon reading of the above-mentioned evaluation item, the process proceeds to Step S205 to make reference to the detection result of Step S109 and a numerical value of the table T4. Specifically, when it is detected that a PS driver has already been installed as a printer driver in Step S109, "PS Driver Is Already Installed: +10 for the button 41, and −10 for the button 42", serving as numeral values corresponding to the detection result in this evaluation item, is applicable. Therefore, in the point chart P4, a score of +10 is given as a point to the box of the button 41 for installing a PS driver, and a score of −10 is given as a point to the box of the button 42 for installing a PCL driver. This is because if a PS driver has already been installed, the possibility of subsequently installing a PCL driver is low.

Further, when it is detected that a PCL driver has already been installed as a printer driver in Step S109, "PCL Driver Is Already Installed: −10 for the button 41, and +10 for the button 42" is applicable. Therefore, a score of −10 is given as a point to the box of the button 41 for installing a PS driver, and a score of +10 is given as a point to the box of the button 42 for installing a PCL driver. This is because if a PCL driver has already been installed, the possibility of subsequently installing a PS driver is low.

Moreover, when it is detected that neither a PS driver nor a PCL driver is installed yet as a printer driver in Step S109, "Neither PS Driver Nor PCL Driver Is Installed Yet: 0 for the button 41, and 0 for the button 42" is applicable, and therefore, a score of 0 is given as a point to each of the boxes of the button 41 for installing a PS driver and the button 42 for installing a PCL driver.

Next, in Steps S207 to S209, the sizes of the button 41 for installing a PS driver and the button 42 for installing a PCL driver are decided, and the buttons 41 and 42 are located on the "PS driver or PCL driver selection" installation screen 94. Then, after the foregoing process steps of Steps S211 to S214 have been performed, the display control process subroutine (Steps S201 to S214) is ended, and the process proceeds to Step S117 shown in FIG. 3.

At this stage, if the points correspond to numerical values presented in the point chart P4 shown in FIG. 14, then as shown in FIG. 13, the button 41 for installing a PS driver is located so as to have a "large" size, and the button 42 for installing a PCL driver is located so as to have a "normal" size. Further, for example, if a PCL driver has already been installed as a printer driver, in the point chart P4, the point of the button 41 for installing a PS driver is not a score of +10 but is a score of −10, while the point of the button 42 for installing a PCL driver is not a score of −10 but is a score of +10. In such a case, unlike FIG. 13, the button 41 for installing a PS driver is located so as to have a "normal" size, and the button 42 for installing a PCL driver is located so as to have a "large" size.

Next, when the process has proceeded to Step S117 shown in FIG. 3, an input signal from the input section 16 operated by the user is detected, and it is determined which of the button 41 for installing a PS driver and the button 42 for installing a PCL driver is selected by the user. Then, based on the determination result, the control section 10 sets the PS driver or the PCL driver as a printer driver.

Thus, in Step S116, one of the button 41 for installing a PS driver and the button 42 for installing a PCL driver is conspicuously displayed based on the detection result of Step S109, and therefore, the user can preferentially recognize the button, which is more likely to be selected. Consequently, the user is allowed to easily determine which of the PS driver and the PCL driver should be selected based on whether or not the PS driver or the PCL driver has already been installed.

Figure 15:
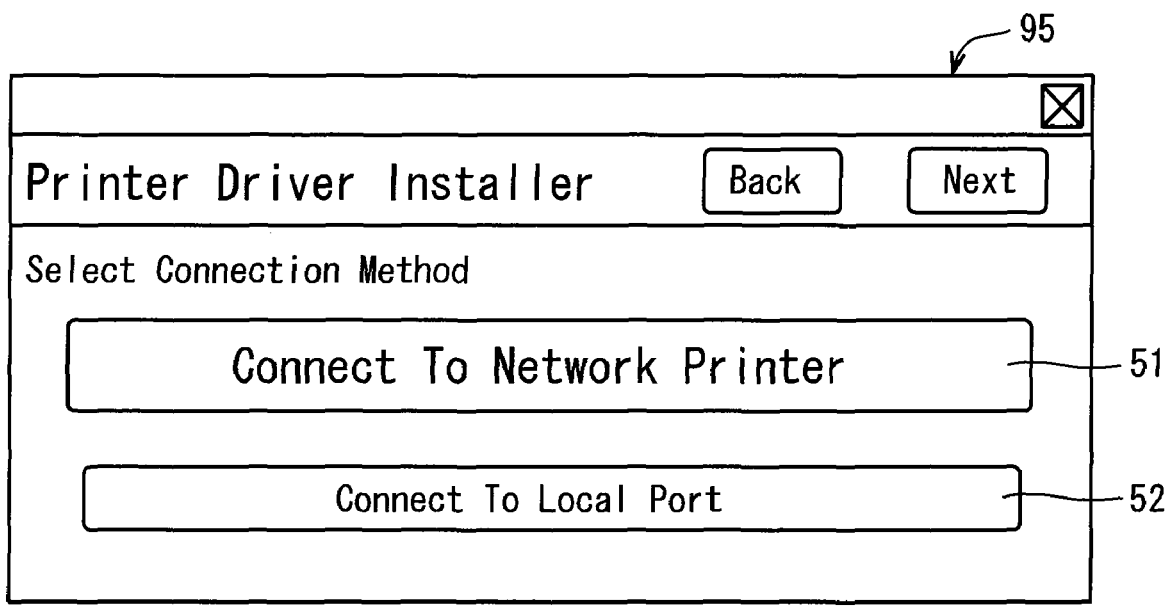
FIG. 15 is a diagram for describing a "connection method selection" installation screen, concerning the information processing apparatus according to the embodiment of the present invention.

Next, in Step S118, for a "connection method selection" installation screen 95 shown in FIG. 15, a process of controlling the display levels of a net setting button 51 serving as a button for selecting printer network connection, and a local connection setting button 52 serving as a button for selecting printer local connection is performed. The "connection method selection" installation screen 95 is associated with a setting item "Connection Method". The connection method is broadly divided into the following two types: network connection and local connection.

Figure 16:
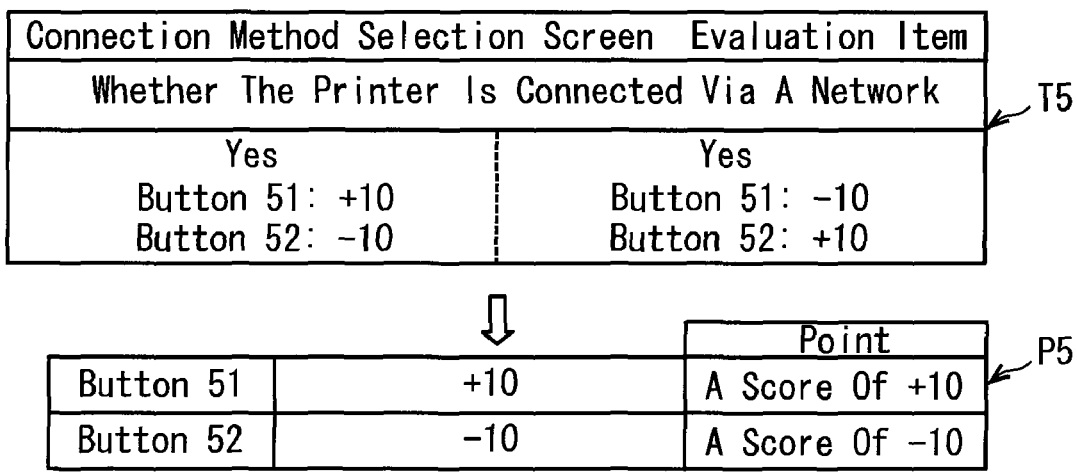
FIG. 16 is a diagram for describing a table and a point chart associated with the "connection method selection" installation screen, concerning the information processing apparatus according to the embodiment of the present invention.

More specifically, the display control process subroutine (Steps S201 to S214) shown in FIG. 4 is executed. It should be noted that the display control process subroutine executed in this case is different from the display control process subroutine (Steps S201 to S214) executed in Step S104 or the like described above in the following three points. First, an installation screen to be subjected to display control is the "connection method selection" installation screen 95, a specific example of which is shown in FIG. 15. Secondly, a point chart to which reference is made is a point chart P5, a specific example of which is shown in FIG. 16. And thirdly, a table to which reference is made is a table T5, a specific example of which is shown in FIG. 16. As a reference chart to which reference is made, the reference chart H1 shown in FIG. 7 is used. Therefore, the description of common parts of the foregoing process steps described in Step S104 or the like will be omitted or simplified.

First, in Steps S201 to S203 shown in FIG. 4, the point chart P5 is prepared for the "connection method selection" installation screen 95.

Next, in Steps S204 to S206, an evaluation item is read from the table T5 associated with the "connection method selection" installation screen 95. The table T5 has an evaluation item "Whether A Printer Is Network-Connected" which is associated with the detection result of Step S107.

Then, in Step S204, upon reading of the above-mentioned evaluation item, the process proceeds to Step S205 to make reference to the detection result of Step S107 and a numerical value of the table T5. Specifically, when it is detected that the printer is connected via a network in Step S107, "Yes: +10 for the button 51, and −10 for the button 52", serving as numeral values corresponding to the detection result in this evaluation item, is applicable. Therefore, in the point chart P5, a score of +10 is given as a point to the box of the net setting button 51, and a score of −10 is given as a point to the box of the local connection setting button 52. This is because if the detected printer is network-connected, the possibility that the user makes a setting for network connection is high.

Further, when it is detected that the printer is not connected via a network in Step S107, "No: −10 for the button 51, and +10 for the button 52" is applicable. Therefore, a score of −10 is given as a point to the box of the net setting button 51, and a score of +10 is given as a point to the box of the local connection setting button 52. This is because if the detected printer is not network-connected, the possibility that the user makes a setting for network connection is low.

Next, in Steps S207 to S209, the sizes of the net setting button 51 and the local connection setting button 52 are decided, and the net setting button 51 and the local connection setting button 52 are located on the "connection method selection" installation screen 95. Then, after the foregoing process steps of Steps S211 to S214 have been performed, the display control process subroutine (Steps S201 to S214) is ended, and the process proceeds to Step S119 shown in FIG. 3.

At this stage, if the points correspond to numerical values presented in the point chart P5 shown in FIG. 16, then as shown in FIG. 15, the net setting button 51 is located so as to have a "large" size, and the local connection setting button 52 is located so as to have a "normal" size. Further, for example, when the printer is not connected via a network, in the point chart P5, the point of the net setting button 51 is not a score of +10 but is a score of −10, and the point of the local connection setting button 52 is not a score of −10 but is a score of +10. In such a case, unlike FIG. 15, the net setting button 51 is located so as to have a "normal" size, and the local connection setting button 52 is located so as to have a "large" size.

Next, when the process has proceeded to Step S119, an input signal from the input section 16 operated by the user is detected, and it is determined which of the net setting button 51 and the local connection setting button 52 is selected by the user. Then, based on the determination result, the control section 10 sets the connection method.

Thus, in Step S118, based on the detection result of Step S107, the net setting button 51 when the printer 2 is connected via the network 5 is displayed more conspicuously than the net setting button 51 when the printer 2 is not connected via the network 5. Therefore, the user can preferentially recognize the net setting button 51 when needed, and is allowed to easily perform a network setting.

Figures 17, 18:
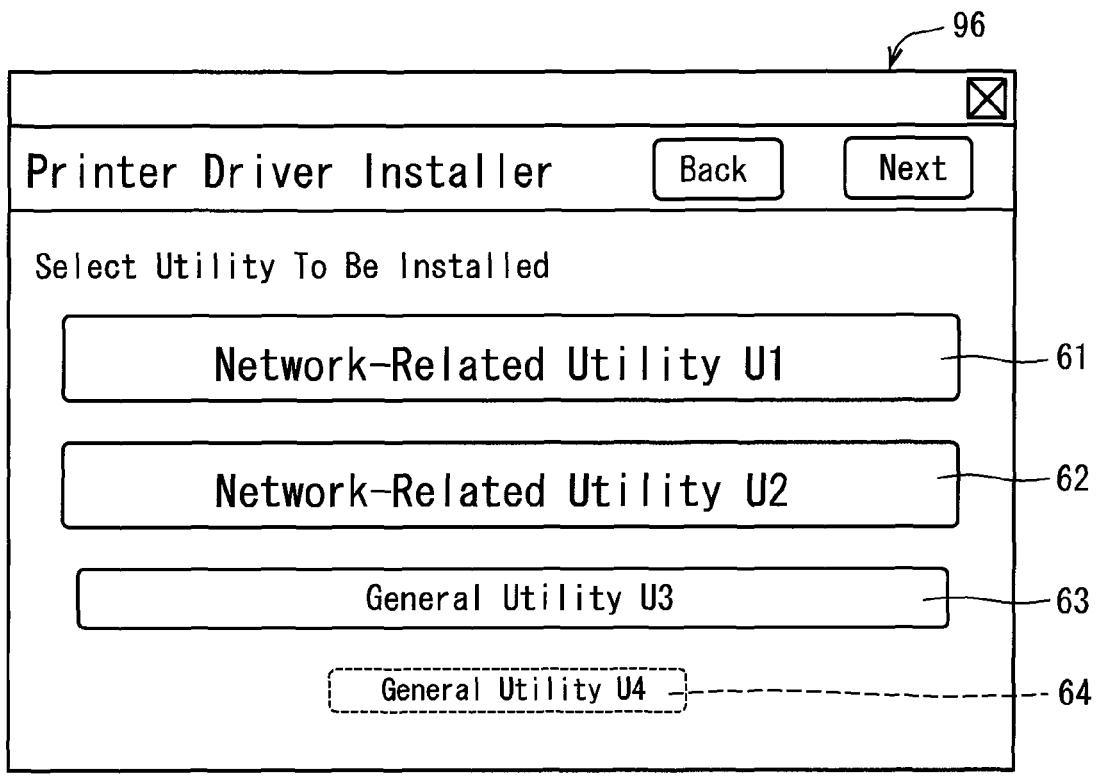
FIG. 17 is a diagram for describing a "utility selection" installation screen, concerning the information processing apparatus according to the embodiment of the present invention.
FIG. 18 is a diagram for describing a table and a point chart associated with the "utility selection" installation screen, concerning the information processing apparatus according to the embodiment of the present invention.

Next, in Step S120, for the "utility selection" installation screen 96 shown in FIG. 17, a process of controlling the display levels of utility selection buttons 61 to 64 is performed. The "utility selection" installation screen 96 is associated with a setting item "Utility Installed Together With Printer Driver". In this embodiment, the utility selection buttons 61 and 62 are associated with the utilities U1 and U2 for improving the usability of the network environment of the printer, and the utility selection buttons 63 and 64 are associated with general utilities irrelevant to the network environment of the printer.

More specifically, the display control process subroutine (Steps S201 to S214) shown in FIG. 4 is executed. It should be noted that the display control process subroutine executed in this case is different from the display control process subroutine (Steps S201 to S214) executed in Step S104 or the like described above in the following three points. First, an installation screen to be subjected to display control is the "utility selection" installation screen 96, a specific example of which is shown in FIG. 17. Secondly, a point chart to which reference is made is a point chart P6, a specific example of which is shown in FIG. 18. And thirdly, a table to which reference is made is a table T6, a specific example of which is shown in FIG. 18. As a reference chart to which reference is made, the reference chart H1 for points and sizes shown in FIG. 7 is used. Therefore, the description of common parts of the foregoing process steps described in Step S104 or the like will be omitted or simplified.

First, in Steps S201 to S203 shown in FIG. 4, the point chart P6 is prepared for the "utility selection" installation screen 96.

Next, in Steps S204 to S206, evaluation items are sequentially read from the table T6 associated with the "utility selection" installation screen 96. The table T6 has the following two evaluation items: "Whether The Printer Is Connected Via A Network" associated with the detection results of Step S107, and "How Many Times Uninstallation Was Performed For The Utility In The Past" associated with Step S110.

Then, in Step S204, upon reading of the first evaluation item "Whether The Printer Is Connected Via A Network", the process proceeds to Step S205 to make reference to the detection result of the Step S107 and a numerical value of the table T6. Specifically, when the printer is connected via a network, "Yes: +10 for the buttons 61 and 62, and 0 for the buttons 63 and 64", serving as numerical values associated with the detection result in this evaluation item, is applicable. Therefore, in the point chart P6, a score of +10 is given as a point to each of the boxes of the utility selection buttons 61 and 62, and a score of 0 is given as a point to each of the boxes of the utility selection buttons 63 and 64.

On the other hand, when the printer is not connected via a network, "No: −10 for the buttons 61 and 62, and 0 for the buttons 63 and 64", serving as numerical values associated with the detection result in this evaluation item, is applicable. Therefore, a score of −10 is given as a point to each of the boxes of the utility selection buttons 61 and 62, and a score of 0 is given as a point to each of the boxes of the utility selection buttons 63 and 64.

Next, in Step S204, upon reading of the second evaluation item "How Many Times Uninstallation Was Performed For The Utility In The Past", the process proceeds to Step S205 to make reference to the detection result of Step S110 and a numerical value of the table T6. Specifically, based on how many times uninstallation was performed for the respective utilities U1 to U4 in the past, a score of −10 is given as a point to each of the boxes of the utility selection buttons 61 to 64 associated with the respective utilities U1 to U4 on a per uninstallation basis. For example, when uninstallation was never once performed in the past for the utilities U1 to U3, a score of 0 is given as a point to each of the boxes of the utility selection buttons 61 to 63 as shown in FIG. 18. Further, if uninstallation was performed three times in the past for the utility U4, a score of −30 is given as a point to the box of the utility selection button 64. The point of the utility, for which uninstallation was performed many times in the past, is considerably decreased in this manner because the possibility that the user selects this utility is extremely low.

Next, in Steps S207 to S209, the sizes of the respective utility selection buttons 61 to 64 are decided, and the utility selection buttons 61 to 64 are located on the "utility selection" installation screen 96. It is to be noted that the utility selection button 64 is not displayed based on the reference chart H1 because the point thereof is a score of −30 (which means that the utility selection button 64 is not displayed although the utility selection button 64 is indicated by dashed lines in FIG. 17). Then, after the foregoing process steps of Steps S211 to S214 have been performed, the display control process subroutine (Steps S201 to S214) is ended, and the process proceeds to Step S121 shown in FIG. 3.

At this stage, if the points correspond to numerical values presented in the point chart P6 shown in FIG. 18, then as shown in FIG. 17, the utility selection buttons 61 and 62 associated with the network-related utilities U1 and U2 are each located on the "utility selection" installation screen so as to have a "large" size. Further, the general utility U3, which is unrelated to the network, is located so as to have a "normal" size. Furthermore, the general utility U4, which is unrelated to the network, is erased from the "utility selection" installation screen 96 because uninstallation was performed many times in the past for the utility U4 and the point thereof is low.

Next, when the process has proceeded to Step S121, an input signal from the input section 16 operated by the user is detected, and it is determined which of the respective utility selection buttons 61 to 64 is selected by the user. Then, based on the determination result, the control section 10 sets the utility to be installed.

Thus, in Step S120, the utility selection buttons 61 and 62 associated with the network-related utilities U1 and U2 are conspicuously displayed based on the detection result of Step S107, and therefore, the user is allowed to easily make a network setting. Furthermore, in Step S120, the utility selection button 64 associated with the utility U4, which was uninstalled many times in the past, is erased based on the detection result of Step S110, thereby saving the user's time and trouble.

Next, in Step S122, custom installation is carried out for the printer driver D1. Specifically, the control section 10 executes installation based on the use language setting made in Step S105, and/or the version of the printer driver D1 that should be installed, the model associated therewith, the utilities installed together therewith, and the like, which have been set by the selection made by the user in Steps S113 to S121. Thus, the printer driver D1, the utilities U1, U2, etc. are stored in the system folder 14S. Then, this installation process is ended.

In this embodiment, Step S122 or S123 is equivalent to installation means for installing the printer driver D1. Step S123 is equivalent to standard installation means, and Step S122 is equivalent to custom installation means. The display section 15 is equivalent to display means for displaying the installation screens 91 to 96.

Steps S101 to S103, and Steps S106 to S110 are equivalent to detection means for detecting the use environment of the computer 1. The registry 14R is equivalent to storage means for storing the tables T1 to T6 having a plurality of detection results detectable in Steps S101 to S103 and Steps S106 to S110, and numerical values associated with the respective detection results.

Steps S104, S111, S113, S116, S118, S120 and the display control process subroutine (Steps S201 to S214) are equivalent to display control means for allowing the display section 15 to display the buttons (e.g., the buttons 11, 21, 31, 41, 51, 61 and 62) relevant to the use environments of the computer 1 detected by Steps S101 to S103 and Steps S106 to S110 serving as the detection means, so that the display levels of these buttons are relatively higher than those of the other buttons.

As described above, in the computer 1 of the present embodiment, among the buttons 11 to 14, 21, 22, 31 to 34, 41, 42, 51, 52 and 61 to 64 arranged on the installation screens 91 to 96, the buttons (e.g., the buttons 11, 21, 31, 41, 51, 61 and 62) relevant to the use environments detected by Steps S101 to S103 and Steps S106 to S110 serving as the detection means are displayed on the display section 15 so that the display levels of these buttons are relatively higher than those of the other buttons. Therefore, the user can recognize the buttons relevant to the use environments of the computer 1 more preferentially than the other buttons, and can thus easily determine which of the buttons should be selected.

Accordingly, the computer 1 of the present embodiment can improve the operability of the installation screens.

Further, this computer 1 stores the tables T1 to T6, the point charts P1 to P6 and the reference chart H1 in the registry 14R. Furthermore, in the display control process subroutine (Steps S201 to S214), reference is made to the detection results actually detected in Steps S101 to S103 and Steps S106 to S110 and the tables T1 to T6, and scores are added to or subtracted from the point charts P1 to P6, and the points are counted and compared with the reference chart H1, thus deciding the outer shapes and character sizes of the respective buttons 11 to 14, 21, 22, 31 to 34, 41, 42, 51, 52 and 61 to 64.

In this case, in the reference chart H1, "Point: a score of +10" is equivalent to a first threshold value, "Point: a score of −10" is equivalent to a second threshold value, and "Point: a score of −20" is equivalent to a third threshold value. Further, for each button, if the point is equal to or greater than the first threshold value, the display section 15 is allowed to display the button so that the sizes of the outer shape and character thereof are "large". Furthermore, for each button, if the point is less than the second threshold value, the display section 15 is allowed to display the button so that the sizes of the outer shape and character thereof are "small". Moreover, for each button, if the point is less than the third threshold value, the display section 15 does not display the button. Therefore, even if there exist a plurality of detection results associated with a specified button, this computer can control the display level of the button based on the sum of the respective numerical values thereof. Consequently, the user easily and minutely determines how much the specified button is important from a comprehensive perspective.

Besides, this computer 1 switches the tables T1 to T6 to be used every time the installation screens 91 to 96 are switched in the display control process subroutine (Steps S201 to S214), and can therefore control the display of each button appropriately for the respective installation screens 91 to 96.

Although the present invention has been described based on the embodiment thereof thus far, the present invention will not be limited to the foregoing embodiment, but can naturally be modified and applied as appropriate without departing from the spirit and scope of the present invention.

For example, in the table T1 shown in FIG. 6, "Yes: +5", serving as a numerical value associated with the detection result in the evaluation item "Whether It Corresponds To The Language Selected At The Time Of Installation In The Past", may be changed to "Yes: +15". In such a case, the importance of this evaluation item becomes higher than that of the evaluation item "Whether It Corresponds To The Language Applied To The OS". Therefore, even if the user intentionally selects the language different from the language applied to the OS, the display levels of the language selection buttons 11 to 14 . . . can be controlled in accordance with the user's needs.

Although a plurality of the tables T1 to T6 are switched for each of the installation screens 91 to 96 in the present embodiment, a table in which these tables are summarized may be adopted. In such a case, there occur a necessary evaluation item and an unnecessary evaluation item for each of the installation screens 91 to 96. Therefore, a determination step of determining "whether or not the evaluation item is a necessary evaluation item for the concerned installation screen" may be inserted between Step S204 and Step S205 of the display control process subroutine.

The use environments of an information processing apparatus include various pieces of information concerning the information processing apparatus, such as a device to be connected, a network environment, a language applied to the operating system, a history of installation or uninstallation in the past, etc. Furthermore, as a detection object for the detection means, an object capable of improving the operability of the installation screen can be selected as appropriate from among these pieces of information.

The present invention can be utilized for information processing apparatuses.

The invention claimed is:

1. An information processing apparatus that starts up an application on an operating system to perform information processing, wherein the information processing apparatus comprises:
   a processor; and
   memory comprising instructions stored therein that, when executed by the processor, cause the information processing apparatus to:
      install the application;
      in response to installing the application, display an installation screen comprising a plurality of selectable buttons, wherein each of the plurality of selectable buttons is respectively associated with one of a plurality of display regions and one of a plurality of setting items;
      detect a use environment of the information processing apparatus;
      determine a respective score for each of the plurality of buttons based on the detected use environment and a table of numerical values associated with each of the plurality of buttons, wherein greater scores are indicative of greater relevance to the detected use environment; and
      display the button with the greatest relevance to the detected use environment by increasing the size of the display region of the button with the greatest score with respect to the display regions of the other buttons.

2. The information processing apparatus according to claim 1, wherein the plurality of selectable buttons comprise a plurality of language selection buttons for selecting a language to be applied to a character on an operation screen displayed at the startup of the application, and wherein the memory further comprises instructions stored therein that, when executed by the processor, cause the information processing apparatus to:
   in detecting a use environment, detect a language applied to the operating system, and
   display the language selection button corresponding to the detected language by increasing the size of the display region of the language selection button corresponding to the detected language with respect to the display regions of the other language selection buttons.

3. The information processing apparatus according to claim 1,
   wherein the use environment includes a device connected to the information processing apparatus, and
   wherein the application is a device driver.

4. The information processing apparatus according to claim 3, wherein the plurality of selectable buttons comprise a plurality of network setting buttons, and wherein the memory further comprises instructions stored therein that, when executed by the processor, cause the information processing apparatus to:
   in detecting a use environment, detect whether the device is connected to the information processing apparatus via a network, and
   display a network setting button indicating that the device is connected to the information processing apparatus via the network by increasing the size of the display region of the network setting button indicating that the device is connected to the information processing apparatus with respect to the display region of a network setting button indicating that the device is not connected to the information processing apparatus via the network.

5. The information processing apparatus according to claim 3, wherein the plurality of selectable buttons comprise a plurality of device driver installation buttons, wherein the memory further comprises instructions stored therein that, when executed by the processor, cause the information processing apparatus to:
   in detecting a use environment, detect a device driver that has already been installed, and
   display the device driver installation button with the greatest relevance to the detected device driver by increasing the size of the display region of the device driver installation button with the greatest score with respect to the display regions of the other device driver installation buttons.

6. The information processing apparatus according to claim 5, wherein the device driver includes a printer driver, wherein the plurality of selectable buttons comprise a plurality of printer driver installation buttons, and wherein the memory further comprises instructions stored therein that, when executed by the processor, cause the information processing apparatus to:
   in response to detecting one of a PostScript driver and a Printer Command Language driver as the printer driver, display the printer driver installation button corresponding to the detected printer driver by increasing the size of the display region of the printer driver installation button corresponding to the detected printer driver with respect to the display region of the printer driver installation button corresponding to the other printer driver.

7. The information processing apparatus according to claim 5, wherein the memory further comprises instructions stored therein that, when executed by the processor, cause the information processing apparatus to:
   in response to detecting an old version of the device driver, display a device driver installation button for selecting installation of a new version of the device driver by increasing the size of the display region with respect to the display region of a device driver installation button for selecting installation of the old version of the device driver.

8. The information processing apparatus according to claim 1, wherein the memory further comprises instructions stored therein that, when executed by the processor, cause the information processing apparatus to:

install the application in a standard installation mode by automatically selecting the application from a plurality of applications;
install the application in a custom installation mode by manually selecting the application from a plurality of the applications in response to user input;
detect whether installation or uninstallation was manually performed in the past for at least one of the plurality of applications; and
in response to detecting that installation or uninstallation was manually performed in the past, display a custom installation button for setting execution of installation by increasing the size of the display region of the custom installation button with respect to the display region of a standard installation button for setting execution of installation.

9. The information processing apparatus according to claim 8, wherein the memory further comprises instructions stored therein that, when executed by the processor, cause the information processing apparatus to:
in response to not detecting that installation or uninstallation was manually performed in the past, display the standard installation button by increasing the size of the display region with respect the custom installation button.

10. An information processing apparatus that starts up an application on an operating system to perform information processing, wherein the information processing apparatus comprises:
a processor; and
memory comprising instructions stored therein that, when executed by the processor, cause the information processing apparatus to perform steps comprising:
installing the application;
displaying, when the application is installed, an installation screen on which a plurality of buttons, each associated with each of a plurality of setting items and operated by a user, are arranged;
detecting a use environment of the information processing apparatus;
allowing, among the buttons arranged on the installation screen, the button relevant to the detected use environment to be displayed so as to be relatively increased in display level with respect to the other buttons;
storing a table having:
a plurality of detection results detectable by the detecting step; and
numerical values associated with the respective detection results,
wherein, when a sum of the numerical values associated with the detection results actually detected in relation to the specified button is equal to or greater than a first threshold value as a result of making reference to the detection results actually detected and the table, the allowing step including allowing the specified button to be displayed so as to be relatively increased in display level with respect to the other buttons, and
wherein, when the sum of the numerical values associated with the detection results actually detected in relation to the specified button is less than a second threshold value (second threshold value≦first threshold value), the allowing step including allowing the specified button to be displayed so as to be relatively decreased in display level with respect to the other buttons.

11. The information processing apparatus according to claim 10,
wherein the storing step further comprises storing a plurality of tables, wherein each of the plurality of tables is respectively associated with one of a plurality of installation screens that are sequentially switched, and
wherein the memory further comprises instructions stored therein that, when executed by the processor, cause the information processing apparatus to perform steps comprising:
in response to switching the installation screen, the tables to be used every time the installation screens are switched.

12. The information processing apparatus according to claim 11,
wherein, when the sum of the numerical values associated with the detection results actually detected in relation to the specified button is less than a third threshold value (third threshold value<second threshold value) as a result of making reference to the detection results actually detected and the table, the allowing step comprises not allowing the specified button to be displayed.

13. The information processing apparatus according to claim 12,
wherein the allowing step comprises not displaying the installation screen on which only one of the buttons is displayed, and
wherein the installing step comprises proceeding with a process based on an indication that a user has selected one of the buttons.

14. An information processing method comprising:
installing an application on an operating system of an information processing apparatus;
in response to installing the application, displaying an installation screen comprising a plurality of selectable buttons, wherein each of the plurality of selectable buttons is respectively associated with one of a plurality of display regions and one of a plurality of setting items;
detecting a use environment of the information processing apparatus;
determining a respective score for each of the plurality of buttons based on the detected use environment and a table of numerical values associated with each of the plurality of buttons, wherein greater scores are indicative of greater relevance to the detected use environment; and
displaying the button with the greatest relevance to the detected use environment by increasing the size of the display region of the button with the greatest score with respect to display regions of the other buttons.

15. A non-transitory computer readable medium on which a program is recorded so as to be readable by an information processing apparatus that starts up an application on an operating system to perform information processing, wherein the program, when executed, causes the information processing apparatus to:
install the application;
in response to installing the application, display an installation screen comprising a plurality of selectable buttons, wherein each of the plurality of selectable buttons is respectively associated with one of a plurality of display regions and one of a plurality of setting items;
detect a use environment of the information processing apparatus;
determine a respective score for each of the plurality of buttons based on the detected use environment and a table of numerical values associated with each of the plurality of buttons, wherein greater scores are indicative of greater relevance to the detected use environment; and display the button with the greatest relevance to the detected use environment by increasing the size of the display region of the button with the greatest score with respect to the display regions of the other buttons.

* * * * *